Aug. 13, 1963  N. BURNELL  3,100,882
ENCAPSULATED VARIABLE INDUCTOR
Filed Feb. 26, 1960
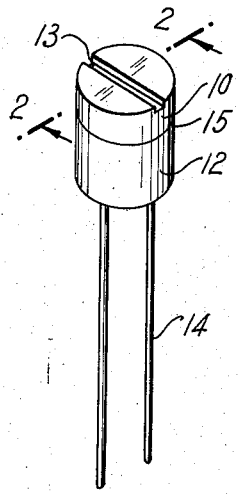
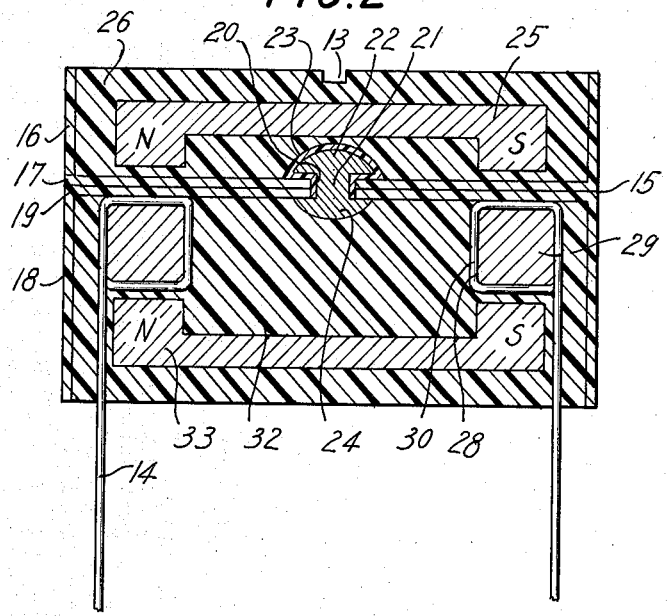
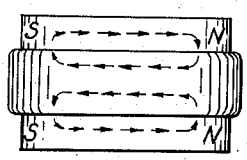
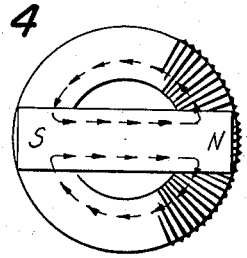
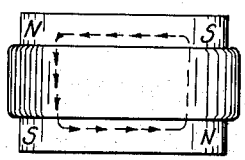
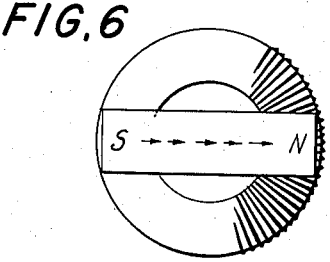
INVENTOR.
NORMAN BURNELL
BY
Sweedler and Zucker
ATTORNEYS

3,100,882
ENCAPSULATED VARIABLE INDUCTOR
Norman Burnell, Scarsdale, N.Y., assignor to Burnell & Co., Inc., Pelham Manor, N.Y., a corporation of New York
Filed Feb. 26, 1960, Ser. No. 11,323
2 Claims. (Cl. 336—96)

This invention is concerned with inductors, particularly toroidal coils, and aims to provide simple economical inductors in which the inductance can be varied rapidly over a wide range, and which are characterized by simplicity of construction and extreme resistance to outside influences.

A great deal of research has been done in recent years on the provision of toroidal coils whose characteristics can be changed over a wide range by the use of biasing fluxes induced by magnets. A particularly satisfactory device of this sort is disclosed in the Gordon Patent 2,762,020, issued September 4, 1956. In such a device, a toroidal coil comprising a ferromagnetic annulus with a toroidal winding is combined with a pair of bar magnets which are mounted on opposite faces of the toroid. One of the magnets is mounted in fixed relationship to the toroid across its diameter adjacent one face, and the other magnet is preferably mounted adjacent the other face for rotation about the axis of the coil, so that it can be swung around from a position where the like poles of the magnets are directly facing each other, to a point where the opposing poles of the magnets are directly facing each other. In the position where opposite poles are facing each other, there is relatively little magnetic flux through the coil, since the flux passes directly from one north pole to the opposite south pole through a very small cross-section of the toroid, then goes through the other magnet and back into the original magnet through another small cross-section of the toroid. When the like poles are facing each other, however, the magnet flux is forced to go through a long circuit, including most of the core of the coil, so that maximum saturation of the coil core occurs.

The manufacture of coils of this type has involved rather complicated assembly problems, and considerable difficulty has been presented in the production of an electrically tight, weather tight assembly.

Accordingly, it is an object of this invention to produce a variable toroidal coil in which the variation is induced by a fixed magnet cooperating with a rotating magnet, which coil is weather-proof and fully protected electrically, which is simple in construction, has no removable parts and yet is extremely easy to adjust from a position of minimum induction to a position of maximum induction.

Still another object of the invention is the production of an assembly of this sort which can be made rapidly and at low cost, and the provision of a process for so doing.

These and other objects can be obtained, according to this invention by encapsulating a toroidal coil inductor with a magnet below it in a single unit, together with a double headed bolt, one head of which is encapsulated in the unit and the other head of which protrudes on the side of the assembly which is adjacent the coil. The free head is then encapsulated together with another fixed permanent bar magnet in a similar unit. One head of the bolt is fixedly embedded in the encapsulating material, and the other head of the bolt is prevented from adhering to the encapsulating material by any treatment which will ensure parting. The result is a completely encapsulated variable toroidal coil in which one of the units can be rotated about its encapsulated bolt head by reason of the failure of the encapsulating material to adhere to the bolt head.

The invention can be best understood by referring to the accompanying drawings, which are provided here by way of illustration and not by way of limitation. In the drawings, FIG. 1 is a perspective of the finished variable inductor.
FIG. 2 is a vertical section through the center of the inductor.
FIG. 3 is a schematic elevation showing the flux distribution through the inductor at the position of maximum biasing flux.
FIG. 4 is a schematic plan view of FIG. 3.
FIG. 5 is a schematic elevation showing the flux distribution at the point of minimum biasing flux.
FIG. 6 is a schematic plan view of FIG. 5.

Referring to FIGS. 1 and 2 of the drawings, the device comprises a cylinder 10 mounted on a second somewhat longer cylinder 12, out of which lead wires 14 protrude. The cylinder 10 can be rotated coaxially with cylinder 12, as by means of a screw driver inserted in slot 13. Preferably the cylinders are separated by a mere hairline division 15.

The device is actually made from a pair of plastic concentric cylindrical cups or housings 16 and 18, mounted with their bases 17—19 flush against each other, so they are separated by a mere hairline 15. A hole 20 is drilled through both bases, at the axis of the cylinders. A rivet 21 with a head 22 is inserted in the hole; the rivet head 22 is coated with a film 23 of some material which prevents the adhesion of the potting material later used. The bottom of the rivet 21, after insertion in the hole, is peened over to form a second head 24, which holds the two cups firmly together.

A magnet 25 is then dropped into the cup 16, and the cup filled with a potting compound 26, which has desirable electrical characteristics. Known desirable potting compounds include the epoxy resins, unsaturated polyester resins, diallylphthalate polymers and the like. The film 23, which prevents the adhesion of the potting compound, may be of any known parting agent. The silicone oils (for example, Dow-Corning's DC20 and DC200) are quite satisfactory for use with epoxy resin potting compounds. Wax films and the solid fatty acids may also be used, with low temperature potting compounds.

After the potting compound 26 has set and thus the magnet 25 has been hermetically sealed in cup or housing 16, as shown in FIGURE 2, the housing containing the magnet is inverted. An inductor 28 is placed in the cup 18 adjacent its base 19; it comprises a core 29 with windings 30, to which are attached the lead wires 14. The cup is then preferably filled with potting compound 32 to just cover the coil, and a magnet 33 is dropped in. Thus, the magnet is immediately adjacent the coil, being separated therefrom only by as much potting compound as is not squeezed out; the amount will vary as desired with the consistency of the potting compound. The cup 18 is then filled with potting compound, and the device is treated as desired to complete the hardening of the potting compound, thus hermetically sealing inductor 28 and magnet 33 within the cup or housing 18, as shown in FIGURE 2. A slot 13 may then be cut in the top of the hardened potting compound 26 to permit rotation with a screw driver.

As illustrated, the entire section enclosed in the cup 16 rotates as a unit about the rivet head 22, and the inductance of the device may be varied from one extreme to the other by rotating through 180° as shown in FIGS. 3 to 6. Obviously, the parting film 23 could be on the head 24, so that the device could rotate as a unit including the rivet. In such event, a raceway could be associated with the head 24 to give easy rotation.

In making the device, the cups 16—18 are preferably made of well-set but not completely hardened pottting compound, so that after the potting compound is completely hardened, the units are essentially homogeneous hardened potting compound enclosing the metallic parts of the device. This makes for optimum electrical uniformity.

It will be noted that the working elements are completely protected electrically and mechanically, to provide a very simple rugged unit with no exposed working parts to be directly attacked by outside influences. Thus, the device lends itself to use under all sorts of conditions, where an ordinary mechanical combination of the units would be susceptible to extensive damage.

Another great advantage of the device is in use with circuits where the exact inductance needed cannot be exactly predicted in advance, and it is necessary to tune the inductance to a desired optimum setting. This can readily be done with the instant device, and the two cups 16 and 18 cemented together with more potting compound, to produce a completely sealed and homogeneously encapsulated unit.

Obviously, the specific form of the invention herein disclosed can be modified extensively without departing from the scope of the invention as defined in the claims.

What is claimed is:

1. A variable toroidal coil inductor consisting essentially of a first housing having side walls and a base, a magnet centrally positioned in said housing, extending substantially across the width thereof, a potting compound encapsulating said magnet and filling said housing and thus maintaining said magnet centrally positioned relative to said housing and hermetically sealed within said housing, a double headed rivet having one head centrally disposed relative to said base, extending through an opening in said base and positioned in the portion of said potting compound adjacent said base for pivotal movement of said first housing relative to said rivet, a second housing having side walls and a top immediately adjacent the first housing, with the said top positioned contiguous to the said base and held in said position by the other head of said double headed rivet, which rivet passes through a central opening in said top and has the other head thereof positioned to securely hold the said top and said base in substantially abutting relationship, a toroidal coil disposed in said second housing immediately adjacent said top, a second magnet positioned adjacent said toroidal coil and extending substantially across the width of said second housing, potting compound in said second housing encapsulating the second-mentioned magnet, said toroidal coil and said second-mentioned magnet being hermetically sealed within said second housing by the potting compound therein, and lead wires from said coil extending through the potting compound in said second housing externally of said second housing.

2. A variable inductor comprising two cylindrical cups, each containing a matrix of insulating material, the said cups having a common axis and the base of one cup being in substantial contact with the base of the other cup, the said other cup having its side walls in longitudinal alignment and extending in the opposite direction from the side walls of the said one cup, a shaft positioned on the common axis passing through the adjoining bases of said cups and thus fastening the two cups, for pivotal movement of one cup relative to the other, the shaft having a head firmly embedded in and attached to one matrix in one cup and a head embedded in but not attached to the matrix in the other cup, whereby the said relative pivotal movement about the common axis can be effected, a magnet embedded in the matrix in one cup extending diametrically across said cup immediately adjacent the base of said cup, a toroidal coil embedded in the matrix in the other cup coaxially with said cup adjacent its base, a magnet embedded in the matrix of the said other cup adjacent said coil extending diametrically across the said other cup, and lead wires leading from the coil through the matrix in the said other cup.

References Cited in the file of this patent
UNITED STATES PATENTS

| | | |
|---|---|---|
| 2,731,607 | Gould | Jan. 17, 1956 |
| 2,762,020 | Gordon | Sept. 4, 1956 |
| 2,775,742 | Bogue | Dec. 25, 1956 |
| 2,887,729 | Imhof | May 26, 1959 |
| 2,948,930 | Herbst | Aug. 16, 1960 |